United States Patent
Qiu et al.

(10) Patent No.: US 12,250,277 B2
(45) Date of Patent: Mar. 11, 2025

(54) METHOD FOR MAKING RECOMMENDATIONS TO A USER AND APPARATUS, COMPUTING DEVICE, AND STORAGE MEDIUM

(71) Applicant: TENCENT TECHNOLOGY (SHENZHEN) COMPANY LIMITED, Shenzhen (CN)

(72) Inventors: Zhijie Qiu, Shenzhen (CN); Jun Rao, Shenzhen (CN); Yi Liu, Shenzhen (CN); Zhou Su, Shenzhen (CN); Shukai Liu, Shenzhen (CN); Zhenlong Sun, Shenzhen (CN); Qi Liu, Shenzhen (CN); Liangdong Wang, Shenzhen (CN); Tiantian Shang, Shenzhen (CN); Mingfei Liang, Shenzhen (CN); Lei Chen, Shenzhen (CN); Bo Zhang, Shenzhen (CN); Leyu Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 962 days.

(21) Appl. No.: 17/329,128

(22) Filed: May 24, 2021

(65) Prior Publication Data

US 2021/0279552 A1 Sep. 9, 2021

Related U.S. Application Data

(63) Continuation of application No. PCT/CN2020/078144, filed on Mar. 6, 2020.

(30) Foreign Application Priority Data

Apr. 18, 2019 (CN) .......................... 201910312887.0

(51) Int. Cl.
G06F 17/10 (2006.01)
G06F 17/16 (2006.01)
(Continued)

(52) U.S. Cl.
CPC .......... H04L 67/306 (2013.01); G06F 18/213 (2023.01); G06N 3/042 (2023.01);
(Continued)

(58) Field of Classification Search
CPC ... H04L 67/306; H04L 67/535; G06F 18/213; G06F 18/253; G06F 16/9535;
(Continued)

(56) References Cited

U.S. PATENT DOCUMENTS 4,718,103 A * 1/1988 Shojima ............... G06V 10/754
382/241
10,977,322 B2 * 4/2021 Muralidhar ......... G06F 16/9535
(Continued)

FOREIGN PATENT DOCUMENTS

CN 104239466 A 12/2014
CN 107145518 A 9/2017
(Continued)

OTHER PUBLICATIONS

The World Intellectual Property Organization (WIPO) International Search Report for PCT/CN2020/078144 Jun. 12, 2020 6 Pages (including translation).
(Continued)

Primary Examiner — Jordany Nunez
(74) Attorney, Agent, or Firm — ANOVA LAW GROUP, PLLC

(57) ABSTRACT

Embodiments of this application provide a method for making recommendations to a user and an apparatus, a computing device, and a storage medium. The method includes obtaining user attribute information, reading attri-
(Continued)

bute information, reading history information, and candidate items; performing intra-group information fusion on the reading attribute information according to preset groupings to obtain reading feature information; obtaining a reading history weight according to the reading history information; obtaining history feature information according to the reading history weight and the reading history information; obtaining user feature information according to the user attribute information, the reading feature information, and the history feature information; and selecting a recommendation item from the candidate items according to the user feature information.

16 Claims, 8 Drawing Sheets

(51) Int. Cl.
    *G06F 18/213*     (2023.01)
    *G06N 3/04*     (2023.01)
    *G06N 3/042*     (2023.01)
    *G06V 10/80*     (2022.01)
    *G06V 10/82*     (2022.01)
    *H04L 67/306*     (2022.01)
    *H04L 67/50*     (2022.01)
    *G06V 40/20*     (2022.01)

(52) U.S. Cl.
    CPC ............ *G06V 10/806* (2022.01); *G06V 10/82* (2022.01); *H04L 67/535* (2022.05); *G06V 40/20* (2022.01)

(58) Field of Classification Search
    CPC ........ G06N 3/042; G06N 3/045; G06N 3/048; G06N 3/08; G06V 10/806; G06V 10/82; G06V 40/20; G06Q 30/0282
    See application file for complete search history.

(56) References Cited

U.S. PATENT DOCUMENTS

| | | | | |
|---|---|---|---|---|
| 2015/0309961 | A1* | 10/2015 | Ozaki | G06F 17/15 706/16 |
| 2016/0132789 | A1* | 5/2016 | Flinn | G06N 5/048 706/14 |
| 2017/0132230 | A1* | 5/2017 | Muralidhar | G06F 16/9535 |
| 2017/0169341 | A1* | 6/2017 | Tang | G06F 16/00 |
| 2018/0285779 | A1* | 10/2018 | Zhou | G06F 16/285 |
| 2019/0005113 | A1* | 1/2019 | Kenedy | G06F 16/2237 |
| 2019/0205939 | A1* | 7/2019 | Lal | G06N 3/045 |
| 2019/0213660 | A1* | 7/2019 | Astrada | G06Q 40/02 |
| 2020/0026772 | A1* | 1/2020 | Wheeler | G06F 16/248 |
| 2023/0126925 | A1* | 4/2023 | Lin | G05B 19/4185 705/7.16 |
| 2024/0202797 | A1* | 6/2024 | Pendar | G06Q 30/0641 |

FOREIGN PATENT DOCUMENTS

| | | |
|---|---|---|
| CN | 108280114 A | 7/2018 |
| CN | 109543714 A | 3/2019 |
| CN | 110046304 A | 7/2019 |

OTHER PUBLICATIONS

Dzmitry Bahdanau et al., "Neural Machine Translation by Jointly Learning to Align and Translate," In Proceedings of the 3rd International Conference on Learning Representations, Apr. 24, 2015. 15 pages.
Hongwei Wang et al., "DKN: Deep Knowledge-Aware Network for News Recommendation," In Proceedings of 26th International World Wide Web Conference, Jan. 30, 2018. 10 pages.
Steffen Rendle et al, "BPR: Bayesian Personalized Ranking from Implicit Feedback," In Proceedings of the Twenty-Fifth Conference on Uncertainty in Artificial Intelligence (UAI2009), pp. 452-461, 2009. 10 pages.
Ruslan Salakhutdinov et al. "Restricted Boltzmann Machines for Collaborative Filtering," In Proceedings of the 24th international conference on Machine learning, pp. 791-798, 2007. 8 pages.
Junxuan Chen et al., "Deep CTR Prediction in Display Advertising," In Proceedings of the 24th ACM international conference on Multimedia, 2016. 10 pages.
Qiwen Liu et al., "Enlister: Baidu's Recommender System for the Biggest Chinese Q&A Website," In RecSys-12: Proceedings of the 6th ACM conference on Recommender systems, pp. 285-288, 2012. 4 pages.
James. Davidson et al., "The Youtube Video Recommendation System," In Proceedings of the Fourth ACM Conference on Recommender Systems, RecSys '10, pp. 293-296, 2010. 4 pages.
Paul Covington et al., "Deep Neural Networks for YouTube Recommendations," In Proceedings of the 10th ACM Conference on Recommender Systems, pp. 191-198, 2016. 8 pages.
Steffen Rendle, "Factorization Machines," In IEEE International Conference on Data Mining, pp. 995-1000, 2010. 6 pages.
Santosh Kabbur et al., "FISM: Factored Item Similarity Models for Top-N Recommender Systems," In Proceedings of the 19th ACM SIGKDD international conference on Knowledge discovery and data mining, pp. 659-667, 2013. 9 pages.

* cited by examiner

METHOD FOR MAKING RECOMMENDATIONS TO A USER AND APPARATUS, COMPUTING DEVICE, AND STORAGE MEDIUM

RELATED APPLICATIONS

This application is a continuation of PCT Application No. PCT/CN2020/078144, entitled "Method and device for making recommendation to user, computing apparatus, and storage medium" and filed on Mar. 6, 202, which claims priority to Chinese Patent Application No. 201910312887.0, filed with China National Intellectual Property Administration on Apr. 18, 2019 and entitled "METHOD FOR MAKING RECOMMENDATIONS TO A USER AND APPARATUS" The two applications are both incorporated herein by reference in their entirety.

FIELD OF THE TECHNOLOGY

This application relates to the field of user recommendations, and in particular, to a method for making recommendations to a user and apparatus, a computing device, and a storage medium.

BACKGROUND OF THE DISCLOSURE

Reading behavior and reading content of a user can represent the user's interest. A recommendation system can provide personalized recommendations based on implicit reading behaviors of a user. Specifically, the recommendation system extracts key information from content that the user usually browses, and analyzes the user's preferences, to generate more personalized recommendations.

SUMMARY

To resolve information loss that occurs during user preference analysis on reading history and to achieve a technical effect of obtaining more accurate recommendation results that meet users' expectations, embodiments of this application provide a method for making recommendations to a user and apparatus, a computing device, and a storage medium.

One aspect of the present disclosure provides a method for making recommendations to a user, performed by a computing device. The method includes obtaining user attribute information, reading attribute information, reading history information, and candidate items; performing intra-group information fusion on the reading attribute information according to preset groupings to obtain reading feature information; obtaining a reading history weight according to the reading history information; obtaining history feature information according to the reading history weight and the reading history information; obtaining user feature information according to the user attribute information, the reading feature information, and the history feature information; and selecting a recommendation item from the candidate items according to the user feature information.

Another aspect of the present disclosure provides a user recommendation apparatus. The apparatus includes a reading feature information obtaining module, a history feature information obtaining module, a user feature information obtaining module, and a recommendation item selection module. The reading feature information obtaining module is configured to obtain corresponding reading feature information according to different reading attribute information. The history feature information obtaining module is configured to obtain history feature information according to reading history information;

Another aspect of the present disclosure provides a computing device, including a processor and a memory, the memory storing computer-executable instructions, the computer-executable instructions, when executed by the processor, causing the processor to perform: obtaining user attribute information, reading attribute information, reading history information, and candidate items; performing intra-group information fusion on the reading attribute information according to preset groupings to obtain reading feature information; obtaining a reading history weight according to the reading history information; obtaining history feature information according to the reading history weight and the reading history information; obtaining user feature information according to the user attribute information, the reading feature information, and the history feature information; and selecting a recommendation item from the candidate items according to the user feature information.

Another aspect of the present disclosure provides a non-transitory computer-readable storage medium, storing computer-executable instructions, the computer-executable instructions, when executed by a processor, causing the processor to perform the foregoing method for making recommendations to a user.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes this application in detail with reference to the accompanying drawings. Apparently, the described embodiments are merely some but not all of the embodiments of this application. All other embodiments obtained by a person skilled in the art based on the embodiments of this application without creative efforts shall fall within the protection scope of this application.

In the description of this application, it can be understood that, terms "first" and "second" are used only for a purpose of description, and shall not be construed as indicating or implying relative importance or implying a quantity of indicated technical features. Therefore, a feature limited by "first" or "second" may explicitly or implicitly include one or more of the features. Moreover, the terms "first", "second", and so on are intended to distinguish between similar objects rather than describe a specific order. It is to be understood that the data termed in such a way are interchangeable in proper circumstances, so that the embodiments of this application described herein can be implemented in orders other than the order illustrated or described herein.

Users have different preferences for different articles or videos, and in some cases, users may passively read. Therefore, a recommendation system treating all browsed content equally is not accurate. Moreover, in the related art, a model-based recall strategy requires a heavy feature engineering workload. Among models that have been proposed, some models are incapable of recalling a large quantity of candidate sets in real time, and some models miss feature information and cannot obtain accurate user features. Therefore, recommendation results are inaccurate and do not meet users' expectations.

Figure 1:
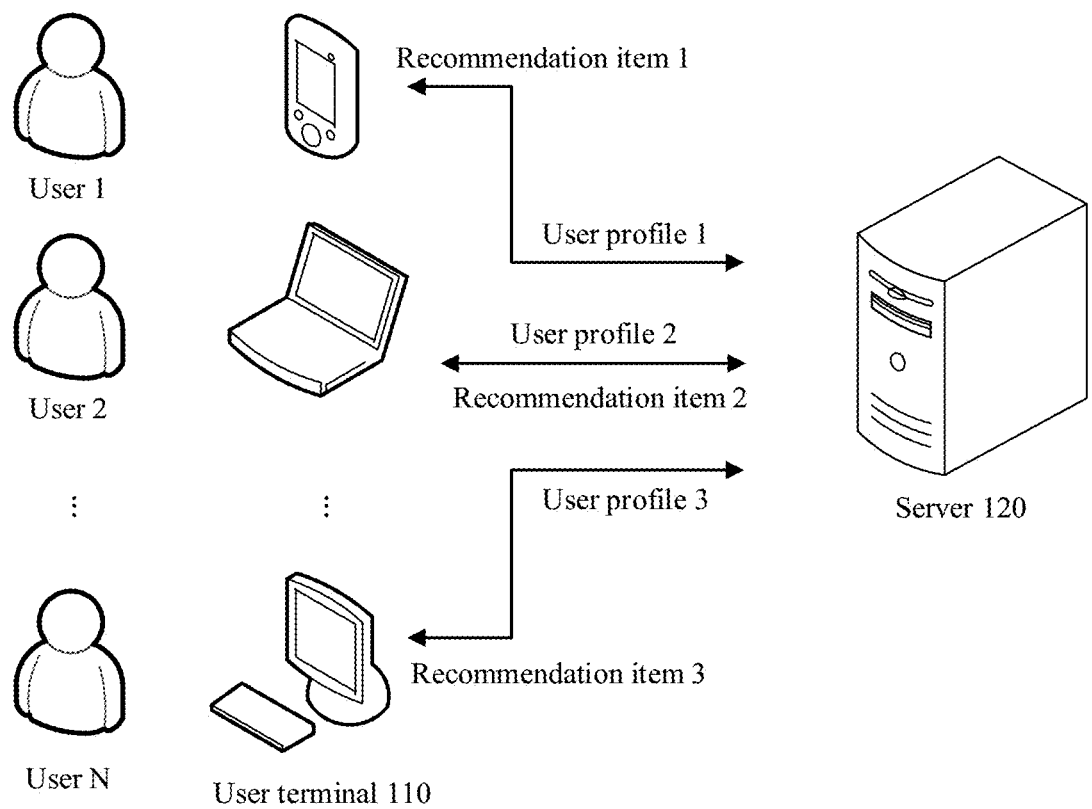
FIG. 1 is a schematic diagram showing an application scenario of a method for making recommendations to a user according to an embodiment of this application.

FIG. 1 is a schematic diagram showing an application scenario of a method for making recommendations to a user according to an embodiment of this application. The application scenario includes computing devices such as a user terminal 110 and a server 120. The user terminal includes, but is not limited to a smart mobile phone, a tablet computer, a notebook computer, a desktop computer, or the like. The server obtains user profile information from the user terminal, the user profile information including user attribute information, reading attribute information, and reading history information. The server analyzes user preferences according to the user profile information and by processing the reading history information, and selects a recommendation item from candidate items according to a user preference analysis result and transmits the recommendation item to the user terminal. When the user terminal logs in to an application or a website by using a social account, the application or the website displays the recommendation item.

Figure 2:
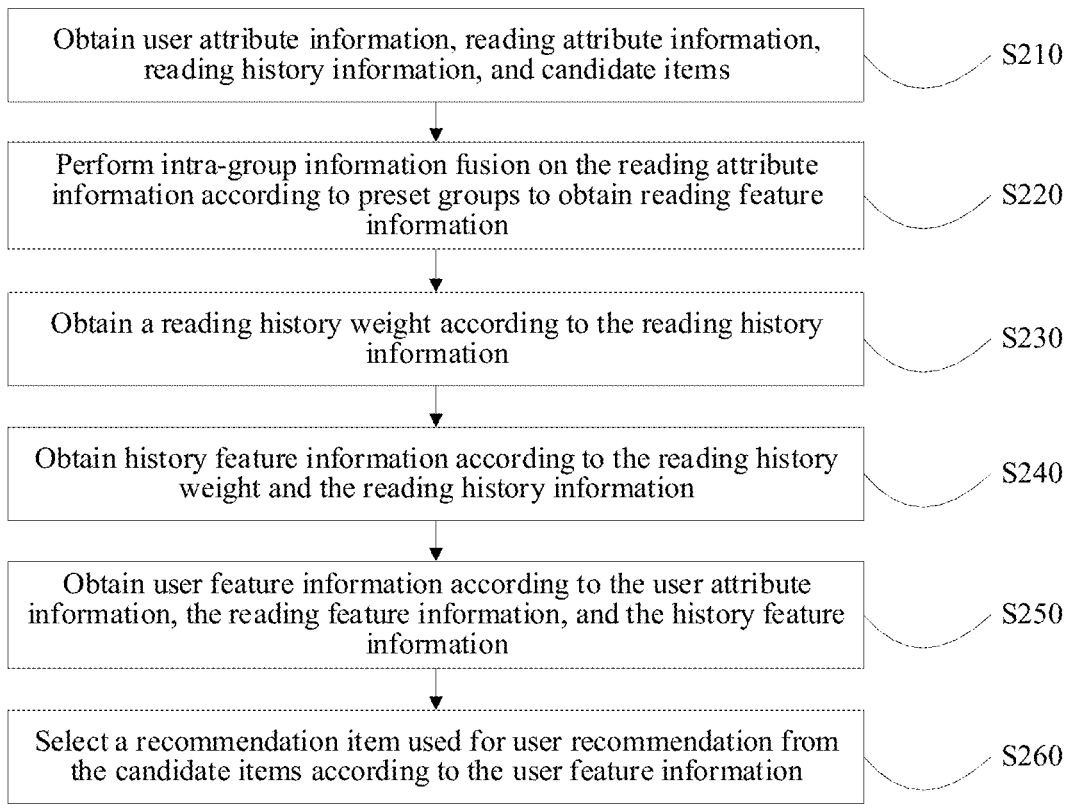
FIG. 2 is a flowchart of a method for making recommendations to a user according to an embodiment of this application.

FIG. 2 shows a method for making recommendations to a user, which may be applicable to a server side. The method includes the following steps.

Step S210. Obtain user attribute information, reading attribute information, reading history information, and candidate items.

In one embodiment of this application, the user attribute information may include age, gender, location, and other information of a user. The user attribute information provides a sketch of the user. The reading attribute information may include long-term keywords, long-term categories, keywords of latest seven days, and categories of latest seven days. The reading history information may include items in latest reading history. The candidate items are to-be-recommended candidate items, and a recommendation item finally used for user recommendation is selected from the candidate items. The item may be an article or a video.

Step S220. Perform intra-group information fusion on the reading attribute information according to preset groupings to obtain reading feature information.

The reading attribute information may be divided into a plurality of feature groups according to a preset condition, for example, a long-term keyword feature group and a long-term category feature group. The keyword is a keyword mark, a group of words representing core content extracted from a body of an article, an introduction of a video, and a title of the article or the video. The category is an abstract description of the article or the video, and a plurality of articles or videos describing similar content are mapped into the same category.

Each feature group includes a plurality of elements, and different users have different quantities of elements. Therefore, intra-group information needs to be fused in each feature group, which specifically includes: performing average pooling on the reading attribute information in the same group to obtain the reading feature information.

Average pooling is performed on elements in each feature group, so as to ensure that input eigenvectors of a fixed size are obtained by mapping inside the same feature group. For example, an input eigenvector of a long-term keyword feature group is calculated according to the following formula:

$$E(longTermTag) = \frac{\sum_{i=1}^{3} e(TagL_i)}{3}$$

In the foregoing formula, E(longTermTag) represents a vector obtained after the average pooling is performed on the attribute longTermTag, $TagL_i$ represents an $i^{th}$ long-term keyword of a user, and $e(TagL_i)$ represents an embedding vector corresponding to the keyword.

Input eigenvectors of the remaining feature groups are similar to the input eigenvector of the long-term keyword feature group. Finally, the input eigenvectors of the feature groups are integrated into input eigenvectors of a fixed size, facilitating subsequent similarity calculation with the candidate items.

Obtaining reading feature information of each feature group and performing average pooling on the reading feature information to obtain the input eigenvectors of a fixed size may lessen the feature engineering workload and simplify subsequent calculation. In addition, fusing the reading feature information into a deep learning network may improve a generalization capability of the deep learning network.

Step S230. Obtain a reading history weight according to the reading history information.

The reading history information includes items of latest reading history, and these items may have information about different keywords or categories. Therefore, features such as keywords and categories included in the items of the latest reading history are collected to form a plurality of feature groups. In one example, the items included in the reading history information are A1, A2, and A3. A keyword of the item A1 is keyword 1, and a category of the item A1 is category 1. A keyword of the item A2 is keyword 2, and a category of the item A2 is category 2. Key words of the item A3 are keyword 3 and keyword 4, and a category of the item A3 is category 3. After the features are regrouped, an obtained keyword feature group is [keyword 1, keyword 2, keyword 3, keyword 4], and an obtained category feature group is [category 1, category 2, category 3].

Figure 3:
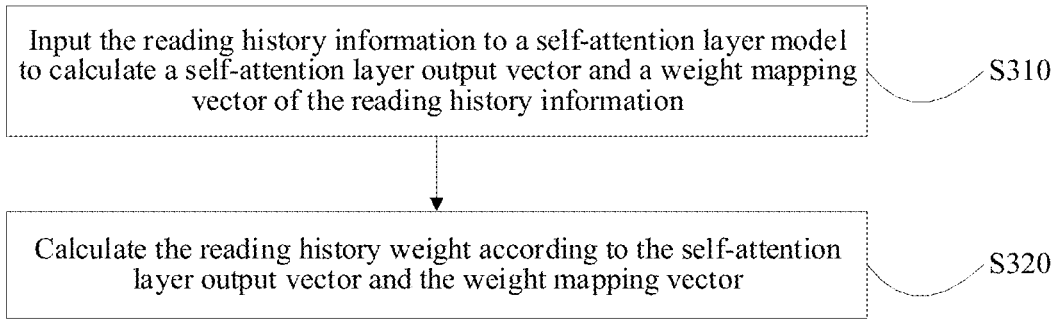
FIG. 3 is a flowchart of a method of calculating a reading history weight in a method for making recommendations to a user according to an embodiment of this application.

After the feature groups are grouped, weighted modeling, for example, self-attention modeling, is performed on the reading history information of the user. FIG. 3 shows a specific method of calculating the reading history weight. The method includes the following steps.

Step S310. Input the reading history information to a self-attention layer model to calculate a self-attention layer output vector of the reading history information.

Step S320. Calculate the reading history weight according to the self-attention layer output vector and a preset parameter.

Figure 4:
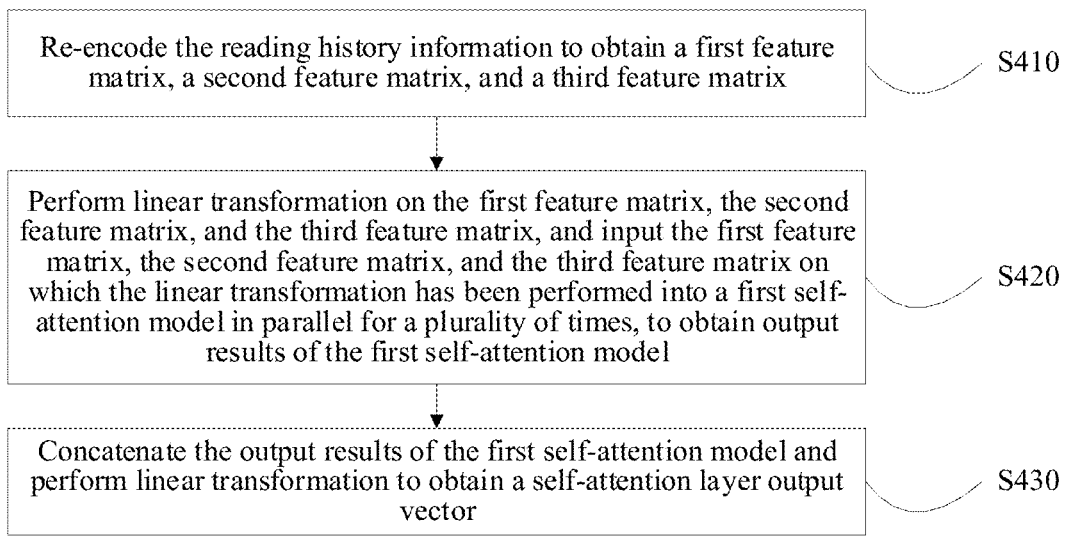
FIG. 4 is a flowchart of a method performed by a self-attention layer model in a method for making recommendations to a user according to an embodiment of this application.

A self-attention layer output vector is obtained after the reading history information is input into an established self-attention layer model. The self-attention layer model may obtain weight information, and the weight information can display a preference of the user for reading history information. FIG. 4 shows a method performed by the self-attention layer model. The method includes the following steps.

Step S410. Re-encode the reading history information to obtain a first feature matrix, a second feature matrix, and a third feature matrix.

Step S420. Perform linear transformation on the first feature matrix, the second feature matrix, and the third feature matrix, and input the first feature matrix, the second feature matrix, and the third feature matrix on which the linear transformation has been performed into a first self-attention model in parallel for a plurality of times, to obtain output results of the first self-attention model.

Step S430. Concatenate the output results of the first self-attention model and perform linear transformation to obtain a self-attention layer output vector.

Figure 5:
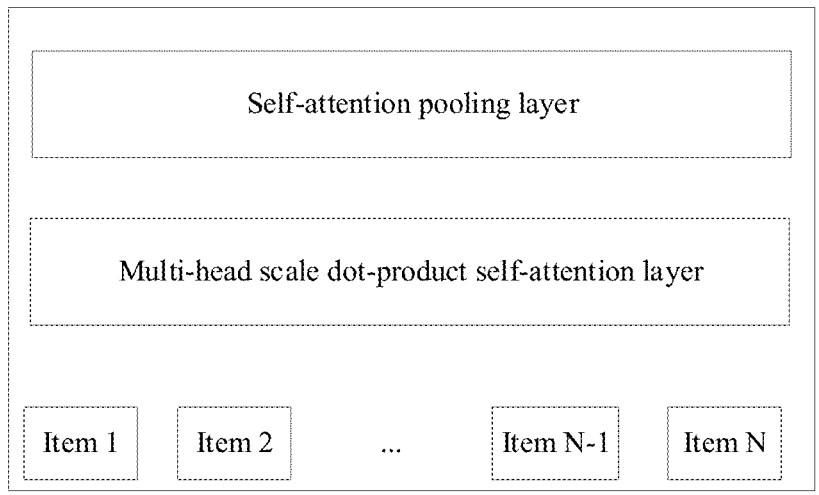
FIG. 5 is a schematic diagram showing a self-attention layer model in a method for making recommendations to a user according to an embodiment of this application.

A multi-head scale dot-product self-attention model is used as the self-attention layer model. Referring to FIG. 5, by using the multi-head scale dot-product self-attention model, user feature information is obtained by performing pooling on data outputted by a self-attention layer after self-attention calculation.

The first self-attention model adopts a scale dot-product self-attention calculation method. The first feature matrix is a Q matrix, the second feature matrix is a K matrix, and the third feature matrix is a V matrix. A dependency relationship between the Q matrix and the K matrix is calculated to obtain a dot product. To avoid an excessive inner product, scale dot-product self-attention calculation may be adjusted by dividing the dot product by the dimension quantity of the K matrix. Q is a query matrix, K is a key matrix, and V is a value matrix.

The Q, K, and V matrices are different representation forms of a reading history vector. The sizes of the Q, K, and V matrices are represented by [n, m], n being an amount of reading history information, and m being a feature dimension quantity. The Q, K, and V matrices are split into H parts by column to form three high-dimensional matrices represented by [n, H, m/H], which is called the multi-head mechanism. Each head exchanges data with only a head at a corresponding location of another piece of data. $Q_i$ represents an $i^{th}$ part of the vector [n, H, m/H], and a dimension quantity is [n, 1, m/H]. $K_i$ and $V_i$ can be deduced by analogy.

Scale dot-product self-attention calculation is performed on the reading history information. Specifically, scale dot-product self-attention calculation is performed on each head and a part corresponding to the head. For example, scale dot-product self-attention calculation on an $i^{th}$ head is shown by the following formula. An inner product is used to calculate self-attention correlation, and the inner product is divided by a dimension quantity of a vector. The scale dot-product self-attention calculation is performed according to the following formula:

$$\text{Attention}(Q_i, K_i, V_i) = \text{softmax}\left(\frac{Q_i K_i^T}{\sqrt{d_k/H}}\right) V_i$$

In the foregoing formula, Attention($Q_i$, $K_i$, $V_i$) is a self-attention network, $Q_i$ is a query matrix, $K_i$ is a key matrix, $V_i$ is a value matrix, $d_k$ is a dimension quantity of an input vector, and a softmax function is a normalized function. Values of Q, K, and V are all item vectors in the reading history information. An output of the foregoing formula is a weighted sum of the values, and a weight allocated to each value is determined by a queried inner product and all keys.

A new representation is obtained by performing the foregoing calculation on each head. For example, a new high-dimensional vector [n, 1, m/H] is obtained by performing the foregoing formula calculation on the $i^{th}$ head, and a new high-dimensional vector [n, H, m/H] is obtained by performing concatenation on new self-attention representation vectors of H heads by using a concat function and according to a second dimension, and a vector [n, m] is obtained through rearrangement. The concat function is used for combining a plurality of character strings or arrays, and the concat function may be configured to connect two or more pieces of information without changing content of the information. Finally, the outputted vector may be multiplied by a feature matrix $W^o$, to obtain a final self-attention layer output vector. A size of the feature matrix $W^o$ is also represented by [n, m].

By using a multi-head self-attention mechanism, the reading history information is calculated through scale dot-product self-attention in parallel for a plurality of times, and independent attention outputs are simply connected and linearly converted into a predicted dimension. The multi-head self-attention mechanism can allow a model to learn related information in different subspaces. In the multi-head self-attention mechanism, each head may be represented by the following formula:

$$head_i=\text{Attention}(QW_i^Q, KW_i^K, VW_i^V)$$

W is a linear transformation parameter for different matrices.

By using the multi-head self-attention mechanism, a self-attention layer output vector of each item in the reading history information is obtained through concatenation of a plurality of heads, and the self-attention layer output vector is integrated into information of all items. Therefore, self-attention models pay attention to different information representing subspaces at different locations. A final obtained self-attention layer output vector is represented by the following formula:

$$Item_i=[head_1, head_2, head_3, \ldots head_n]W^o$$

The self-attention layer output vector is multiplied by a mapping matrix $W^o$, and a concatenated vector is remapped into a multi-dimensional space.

A weight of each item may be obtained according to a self-attention layer output vector and a weight mapping vector. A specific calculation formula is as follows:

$$a=\text{softmax}(v_a \tanh(W_a H^T))$$

tanh is an activation function, $H^T$ is a self-attention layer output vector, $W_a$ is a mapping matrix, and $v_a$ is a weight mapping vector. After normalization is performed by using the Softmax function, a weight of each item is obtained. The Softmax function is a normalized exponential function. The weight mapping vector is a preset parameter that is initialized randomly when a user recommendation model is initially trained and dynamically updated according to an optimization algorithm during training. A final vector that is saved after the training is the weight mapping vector.

Weights of articles and videos in the reading history may prevent information from losing and filter passive reading information, which helps select a recommendation item more accurately, and make a recommendation result more suitable for the user and more personalized. Adopting the multi-head attention mechanism helps learn high-order crossover features, which makes understanding of user features more accurate.

Step S240. Obtain history feature information according to the reading history weight and the reading history information.

The method of obtaining the history feature information includes: inputting the self-attention layer output vector to an attention pooling layer model, and performing weighted averaging on the self-attention layer output vector according to the reading history weight to obtain the history feature information.

After the weight of each item is obtained, a weight value is allocated to each self-attention layer output vector and weighted averaging is performed to obtain the history feature information after the reading history information is fused. A specific calculation formula is as follows:

$$c=Ha^T$$

H is the self-attention layer output vector, $a^T$ is the weight of each item, and c is the history feature information.

In one application scenario, the user has different preferences for the articles and videos in the reading history, and the user may have passive reading behavior. The history feature information is obtained by performing weighted averaging on items according to the preferences of the user for the items, which better complies with a feature that the user has different preferences for different playback history. In addition, weight reduction may further be performed on the passive reading behavior to eliminate interference information and improve the accuracy of the recommendation item.

Step S250. Obtain user feature information according to the user attribute information, the reading feature information, and the history feature information.

Figure 6:
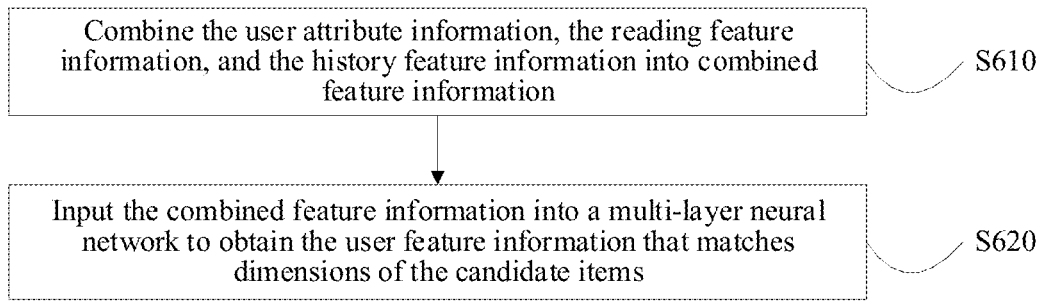
FIG. 6 is a flowchart of a method of obtaining user feature information in a method for making recommendations to a user according to an embodiment of this application.

Referring to FIG. 6, the operation of obtaining user feature information by combining the user attribute information, the reading feature information, and the history feature information includes the following steps.

Step S610. Combine the user attribute information, the reading feature information, and the history feature information into combined feature information.

Step S620. Input the combined feature information into a multi-layer neural network to obtain the user feature information that matches dimensions of the candidate items.

In one example, the reading feature information is obtained by dividing the reading attribute information into the feature groups and performing a pooling operation on the feature groups, and each feature group has corresponding reading feature information. The history feature information is information obtained by performing weighted averaging on the reading history information. The user attribute information is information about the age, gender, and location of the user. The reading feature information, the history feature information, and the user attribute information are combined into high-dimensional combined feature information by using a concat function. The concat function is a function combining a plurality of character strings or arrays, and the concat function may be configured to connect two or more pieces of information without changing content of the information.

Figure 7:
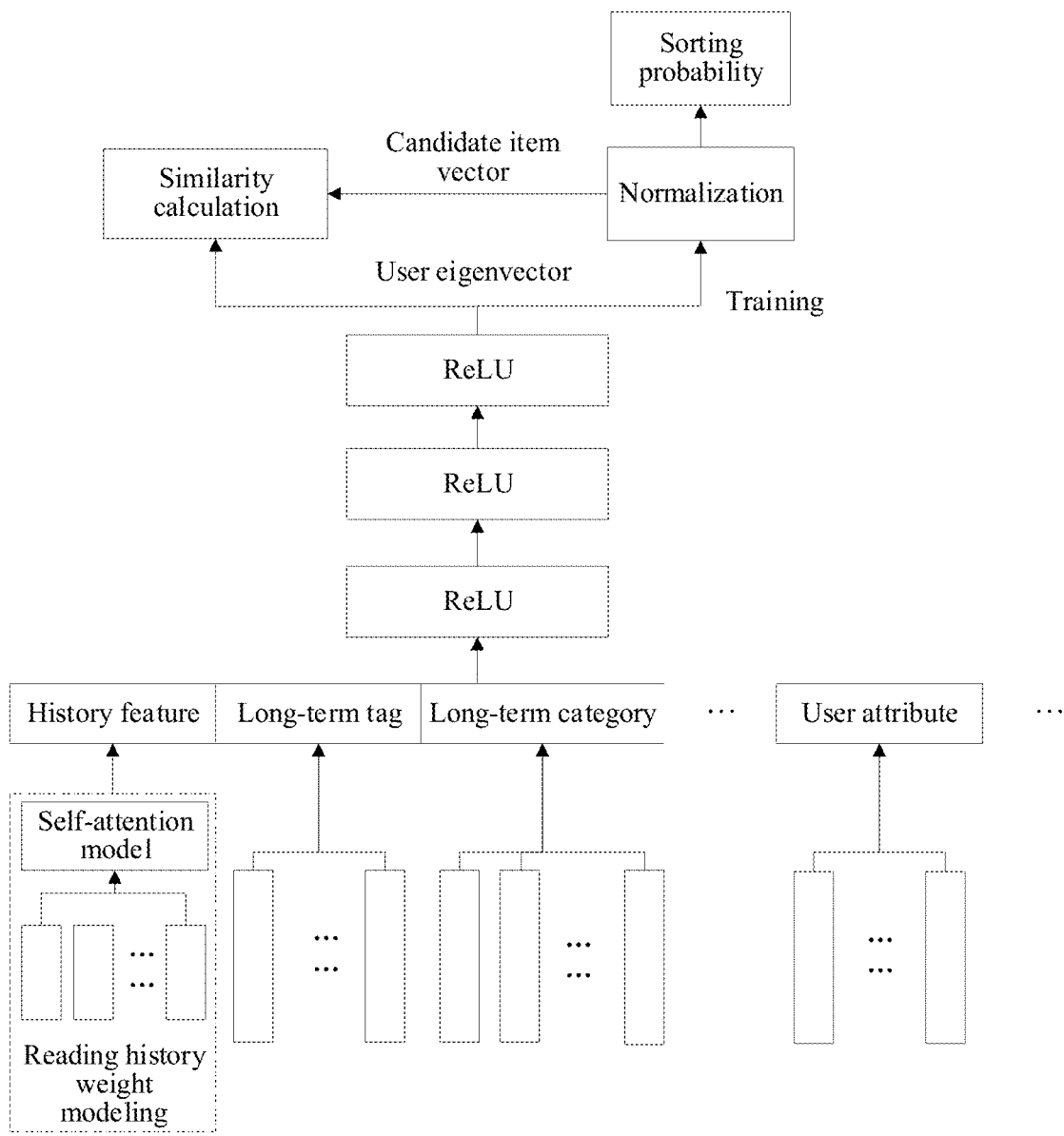
FIG. 7 is a schematic diagram showing a model framework used for item promotion according to user features according to an embodiment of this application.

Referring to FIG. 7, user feature information is generated after the combined feature information is processed by using a deep learning network. The combined feature information is processed by using a multi-layer feedforward neural network, and each layer uses Rectified Linear Unit (ReLU) as an activation function, and a user eigenvector $E_u$ is finally obtained. The user eigenvector $E_u$ is the user feature information. A dimension quantity of the finally obtained user eigenvector $E_u$ is consistent with a dimension quantity of the candidate item, which may be understood that the user eigenvector and the vector of the candidate item are mapped into the same space. This facilitates subsequent cosine similarity calculation on the user eigenvector and the vector of the candidate item.

According to the foregoing method of obtaining user feature information, reading feature information, history feature information, and user attribute information of a user are combined into combined feature information, and the combined feature information is arranged by using a deep learning network to obtain the user feature information that matches dimensions of candidate items. This method can effectively fuse profile features of the user and recall more personalized recommendation results for the user.

Step S260. Select a recommendation item used for recommendation to the user from the candidate items according to the user feature information.

Figure 8:
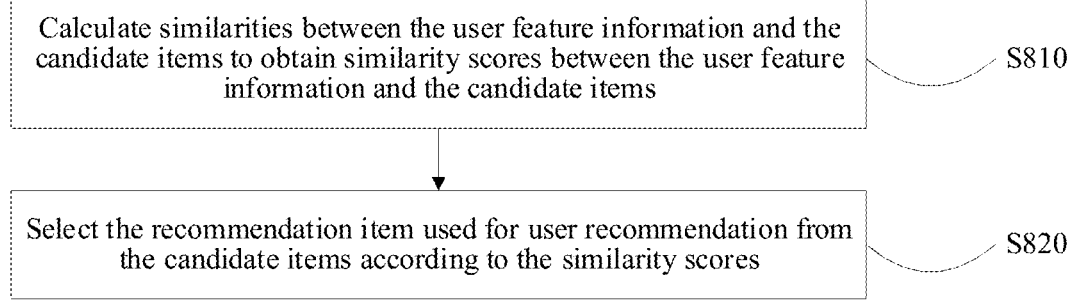
FIG. 8 is a flowchart of a method of obtaining a recommendation item in a method for making recommendations to a user according to an embodiment of this application.

The user feature information is generated by using the deep learning network, and a recommendation result budget is obtained according to the user feature information. Referring to FIG. 8, the method of obtaining the recommendation item includes the following steps.

Step S810. Calculate degree of similarity between the user feature information and the candidate items to obtain similarity scores between the user feature information and the candidate items.

Step S820. Select the recommendation item used for recommendation to the user from the candidate items according to the similarity scores.

In one embodiment, the user feature information is generated after the combined feature information is processed by using the feedforward neural network. Assuming that a pool of the candidate items is $[X_1, X_2, X_3 \ldots X_n]$, a cosine similarity between a vector of each candidate item and the user eigenvector $E_u$ is calculated, and several candidate items whose vectors having a highest cosine similarity with the user eigenvector $E_u$ are selected for recommendation. A cosine similarity between two vectors is calculated according to the following formula:

$$\text{Cos}(u, v) = \frac{\sum_{i=1}^{n} u_i \times v_i}{\sqrt{\sum_{i=1}^{n} u_i^2} \sqrt{\sum_{i=1}^{n} v_i^2}}$$

u and v are two vectors with the same dimension, and are respectively corresponding to embedded vectors of the user eigenvector $E_u$ and the candidate item. $u_i$ and $v_i$ are respectively corresponding to eigenvalues of the dimensions.

In one example, there is a user U1, a user eigenvector $E_{u1}$ is obtained according to user attribute information, reading feature information, and history feature information of the user U1. Assuming that a pool of candidate items is $[X_1, X_2, X_3 \ldots X_{10}]$, and there are 10 candidate items. After a cosine similarity between $E_{u1}$ and each candidate item is calculated, a most similar candidate item $[X_3, X_5, X_7]$ is obtained, and the most similar candidate item is used as a recommendation candidate item.

A method for making recommendations to a user provided in this embodiment of this application is an item collaborative filtering (Item CF) recommendation algorithm. The Item CF recommendation algorithm calculates an item similarity by digging item co-occurrence information, and performs recommendation and filtering by using the item similarity.

In one embodiment, the method for making recommendations to a user may be implemented by using a user collaborative filtering (User CF) recommendation algorithm. The User CF recommendation algorithm digs user similarity information and recommends objects that similar users like.

In one embodiment, the method for making recommendations to a user may be implemented by using a content collaborative filtering (Content CF) recommendation algorithm. The Content CF recommendation algorithm calculates a content similarity by digging reading content information, and performs recommendation and filtering by using the content similarity.

Figure 9:
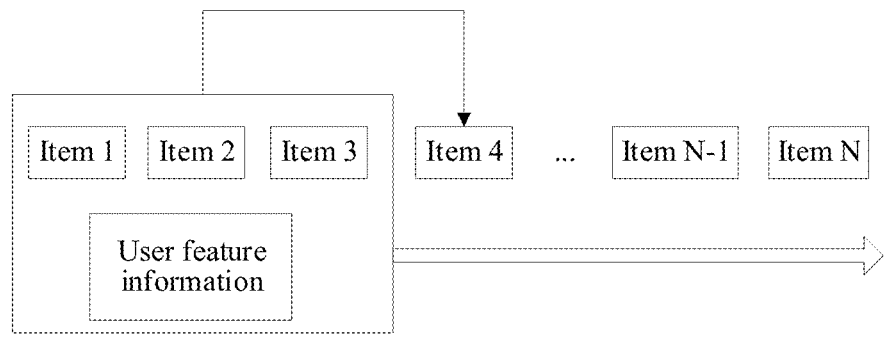
FIG. 9 is a schematic diagram showing a training data model in a method for making recommendations to a user according to an embodiment of this application.

Training data of this recommendation model is generated based on a reading sequence of the user and user feature information. Referring to FIG. 9, a sliding window is set in this model, a reading sequence and user feature information inside the window are used for predicting a next item that the user may be interested in. As shown in FIG. 9, the size of the window is 3, items in the reading sequence of the user are [item 1, item 2, item 3], and the window further includes the user feature information, the user feature information including reading feature information, history feature information, and user attribute information. A probability of the event in which the user clicks a next item 4 is predicted by using [user feature information]+[item 1, item 2, item 3]. Then, after the window is moved to the right by one location, a generated training sample is [user feature information]+ [item 2, item 3, item 4], and a probability of the event in which the user clicks a next item 5 is predicted. The remaining training data is generated in sequence by applying the same method.

Predicting a probability in which the user clicks a next item by using the training model may improve the generalization capability of the learning neural network.

Figure 10:
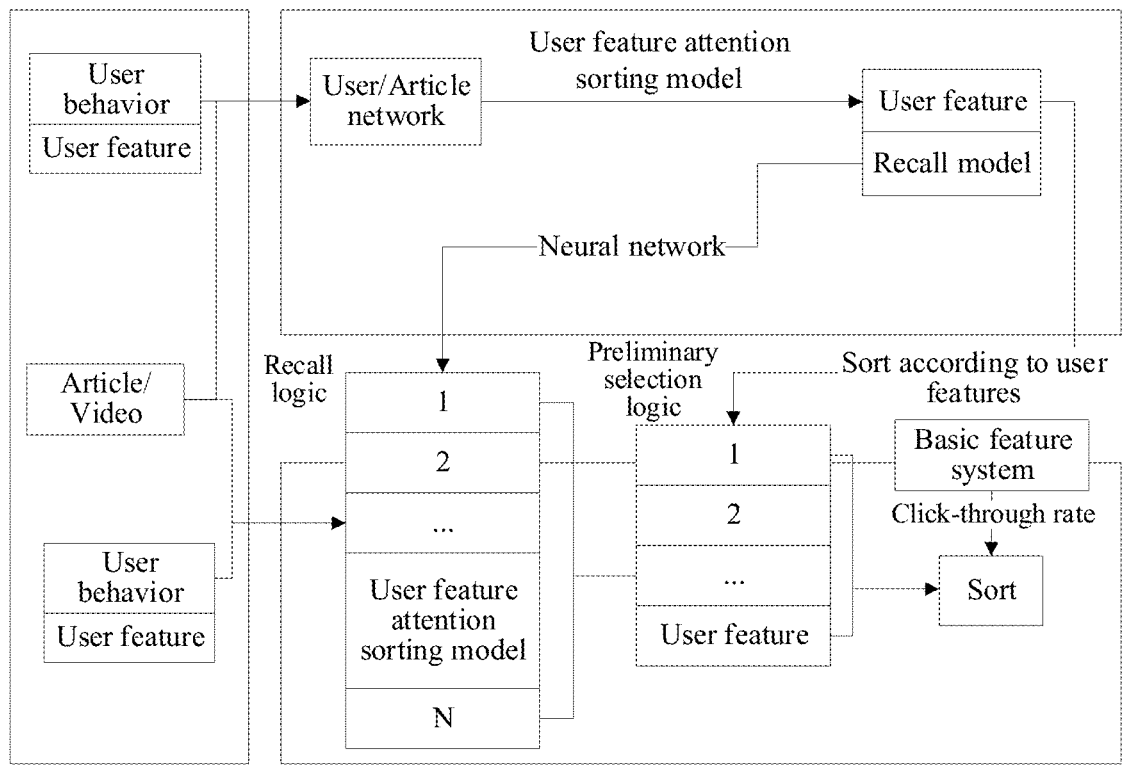
FIG. 10 is a schematic logical diagram showing a method for making recommendations to a user being applied to a scenario according to an embodiment of this application.

In one example, referring to FIG. 10, the foregoing method for making recommendations to a user may be applied to a service scenario of making recommendations.

In the recommendation scenario, according to content that the user has browsed, including information such as videos or articles, long-term keywords, long-term categories, keywords of latest seven days, and categories of latest seven days of the videos or the articles are obtained, and recent reading history of the user is obtained.

Reading feature information of the user is obtained according to the long-term keywords, the long-term categories, the keywords of latest seven days, and the categories of latest seven days that display the user's reading attribute.

A self-attention layer model is established according to the reading history of the user, and weight information of each item in the reading history is obtained. Then, weighted averaging is performed on the reading history, weighting is performed on items that the user prefers, and weight reduction is performed on items that the user reads passively, to obtain history feature information. For example, when reading an article or watching a video, a user pays more attention to a detective fiction and browses the same musical video clip for five times, and closes a beauty makeup video after playing the video for several seconds by mistake. Therefore, although the detective fiction, the musical video, and the beauty makeup video are all in reading history of the user, apparently the user pays less attention to the beauty makeup video. Therefore, weight reduction needs to be performed on beauty makeup videos, to avoid recommending beauty makeup videos to the user.

The user feature information is obtained by combining the history feature information, reading feature information, and basic attribute information such as gender, location, and age of the user. A recommendation item is obtained after similarity calculation is performed on candidate items according to the user feature information.

After a user reads an article or watches a video and enters a user recommendation scenario, the recommendation item obtained by using the foregoing method for making recommendations to a user may be obtained.

In some embodiments of this application, the method for making recommendations to a user may be implemented in a recommendation system. The recommendation system includes recall logic, preliminary selection logic, and sorting logic. The recall logic may perform data pull recall according to specific user feature information and based on various dimensions such as targeted personalization, generalization, and popularity.

A serialized recall model is configured to help each user having reading click behavior recall candidate items. Latest history feature information, reading feature information, and user attribute information of the user are obtained and combined into user feature information, the user feature information is encoded by using a trained network, and then some candidate items with highest scores are calculated according to strategies described in the method for making recommendations to a user and are used for recall recommendation.

The preliminary selection logic is responsible for performing preliminary screening on a large quantity of recall results according to a specific rule, for example, user file correlation, timeliness, region, diversity, and the like, to reduce a sorting calculation scale. The sorting calculation (sorting logic) sorts final results according to a click rate prediction model and represent the sorted results to the user. The preliminary selection logic and the sorting logic need to use a plurality of features, and calculated user eigenvectors are added as features in rough sorting to provide fine semantic features for rough sorting.

A quantity of candidate item sets in a user recommendation service scenario is large, and exceeds 10 million. To efficiently complete on-line real-time recall of the candidate item sets, a matching layer may be set to calculate an inner product or a cosine similarity. In addition, a distributed k-nearest neighbor (k-NN) server is provided to complete on-line real-time recall calculation. Therefore, the entire system is capable of recalling in real time candidate sets whose quantity exceeds 10 million.

According to the method for making recommendations to a user provided in the embodiments of this application, by using a deep learning feedforward neural network, reading history information, reading attribute information, and user attribute information of a user are effectively fused into user feature information, and weighted modeling is performed on the reading history information of the user to avoid loss of the reading history information. In addition, weight reduction is performed on passive reading behavior to make recommendations more accurate and personalized.

Figure 11:
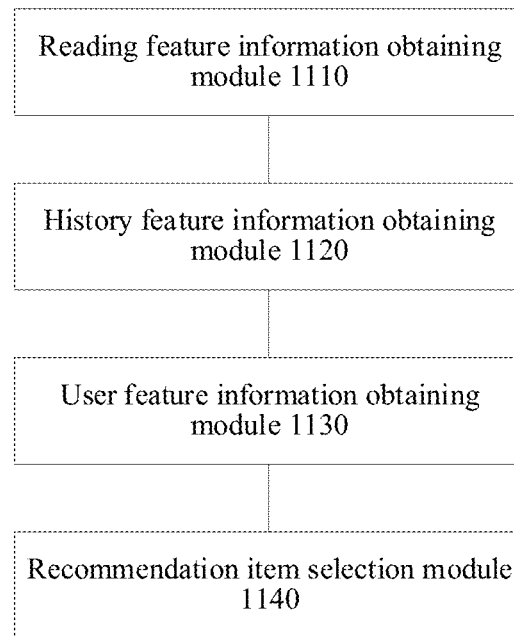
FIG. 11 is a schematic structural diagram of a user recommendation apparatus according to an embodiment of this application.

One embodiment of this application further provides a recommendation apparatus. Referring to FIG. 11, the apparatus includes a reading feature information obtaining module 1110, a history feature information obtaining module 1120, a user feature information obtaining module 1130, and a recommendation item selection module 1140.

The reading feature information obtaining module 1110 is configured to perform intra-group information fusion on reading attribute information according to preset groupings to obtain reading feature information.

The history feature information obtaining module 1120 is configured to obtain history feature information according to reading history information.

The user feature information obtaining module 1130 is configured to obtain user feature information according to user attribute information, the reading feature information, and the history feature information.

The recommendation item selection module 1140 is configured to select a recommendation item used for recommendations to the user from candidate items according to the user feature information.

In one embodiment, the reading attribute information includes long-term keywords, long-term categories, keywords of latest seven days, and categories of latest seven days. Because the foregoing groups have different quantities of items, relative fixed reading feature information is obtained by performing intra-group information average pooling on the reading attribute information according to the preset groupings.

Figure 12:
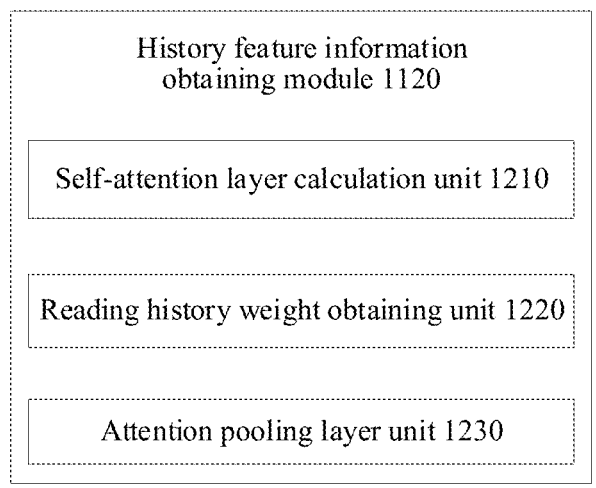
FIG. 12 is a schematic structural diagram of a history feature information obtaining module in a user recommendation apparatus according to an embodiment of this application.

Referring to FIG. 12, the history feature information obtaining module 1120 includes a self-attention layer calculation unit 1210, a reading history weight obtaining unit 1220, and an attention pooling layer unit 1230.

The self-attention layer calculation unit 1210 is configured to input the reading history information into a self-attention layer model to obtain a self-attention layer output vector.

The reading history weight obtaining unit 1220 is configured to calculate a reading history weight according to the self-attention layer output vector and a preset parameter.

The attention pooling layer unit 1230 is configured to input the self-attention layer output vector to an attention pooling layer model, and perform weighted averaging on the self-attention layer output vector according to the reading history weight to obtain the history feature information.

In one embodiment, a multi-head scale dot-product self-attention model is used as the self-attention layer model. A first feature matrix is a query matrix, a second feature matrix is a key matrix, and a third feature matrix is a value matrix. A scale dot-product mechanism is calculating a dependency relationship between the query matrix and the key matrix to obtain a dot product. To avoid an excessive inner product, the scale dot-product self-attention calculation method may be adjusted by dividing the dot product by a dimension quantity of the key matrix. By using a multi-head mechanism, the reading history information is calculated through scale dot-product self-attention in parallel for a plurality of times, and independent attention outputs are simply connected and linearly converted into a predicted dimension.

Figure 13:
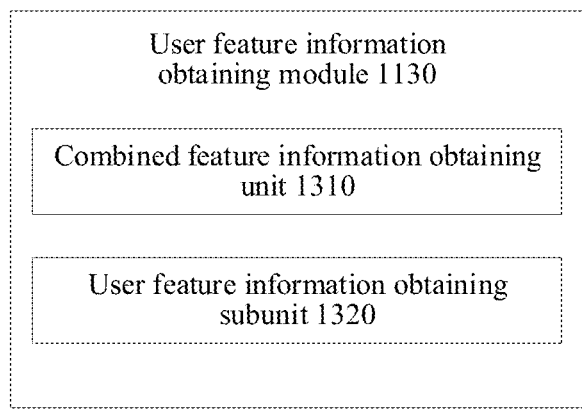
FIG. 13 is a schematic structural diagram of a user feature information obtaining module in a user recommendation apparatus according to an embodiment of this application.

Referring to FIG. 13, the user feature information obtaining module 1130 includes a combined feature information obtaining unit 1310 and a user feature information obtaining subunit 1320.

The combined feature information obtaining unit 1310 is configured to combine the user attribute information, the reading feature information, and the history feature information into combined feature information.

The user feature information obtaining subunit 1320 is configured to input the combined feature information into a multi-layer neural network to obtain the user feature information that matches dimensions of the candidate items.

Figure 14:
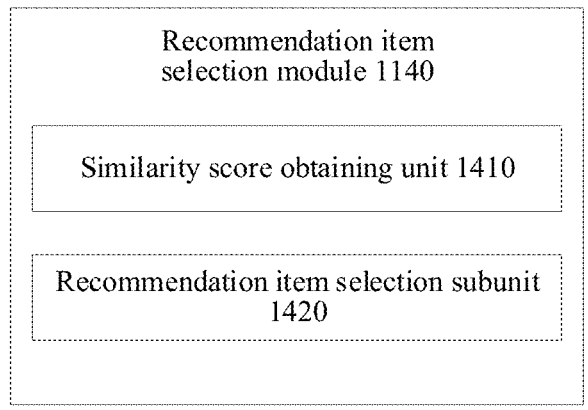
FIG. 14 is a schematic structural diagram of a recommendation item selection module in a user recommendation apparatus according to an embodiment of this application.

Referring to FIG. 14, the recommendation item selection module 1140 includes a similarity score obtaining unit 1410 and a recommendation item selection subunit 1420.

The similarity score obtaining unit 1410 is configured to obtain similarity scores between recommendation reference information and the candidate items according to the recommendation reference information and the candidate items.

The recommendation item selection subunit 1420 is configured to select the recommendation item used from the candidate items according to the similarity scores.

In one embodiment, a cosine similarity may be used for similarity calculation. Therefore, when the user feature information is obtained, a dimension of the user feature information is simplified into a dimension that matches the candidate items by using a neural network. The similarity calculation is performed on a user eigenvector of the user feature information and vectors of the candidate items, several candidate items with highest similarity scores are selected as a recommendation item to be recommended to a user.

The apparatus provided in the foregoing embodiments may perform the method provided in any embodiment of this application, and have corresponding functional modules for performing the method and beneficial effects thereof. For technical details not described in detail in this embodiment, refer to the method for making recommendations to a user provided in any embodiment of this application.

An embodiment of this application further provides a computer-readable storage medium, the storage medium storing computer-executable instructions, the computer-executable instructions being loaded by a processor to perform the method for making recommendations to a user provided in the embodiments of this application.

An embodiment of this application further provides a computing device, including a processor and a memory, the memory storing computer-executable instructions, the computer-executable instructions being suitable to be loaded by the processor to perform the method for making recommendations to a user provided in the embodiments of this application.

Figure 15:
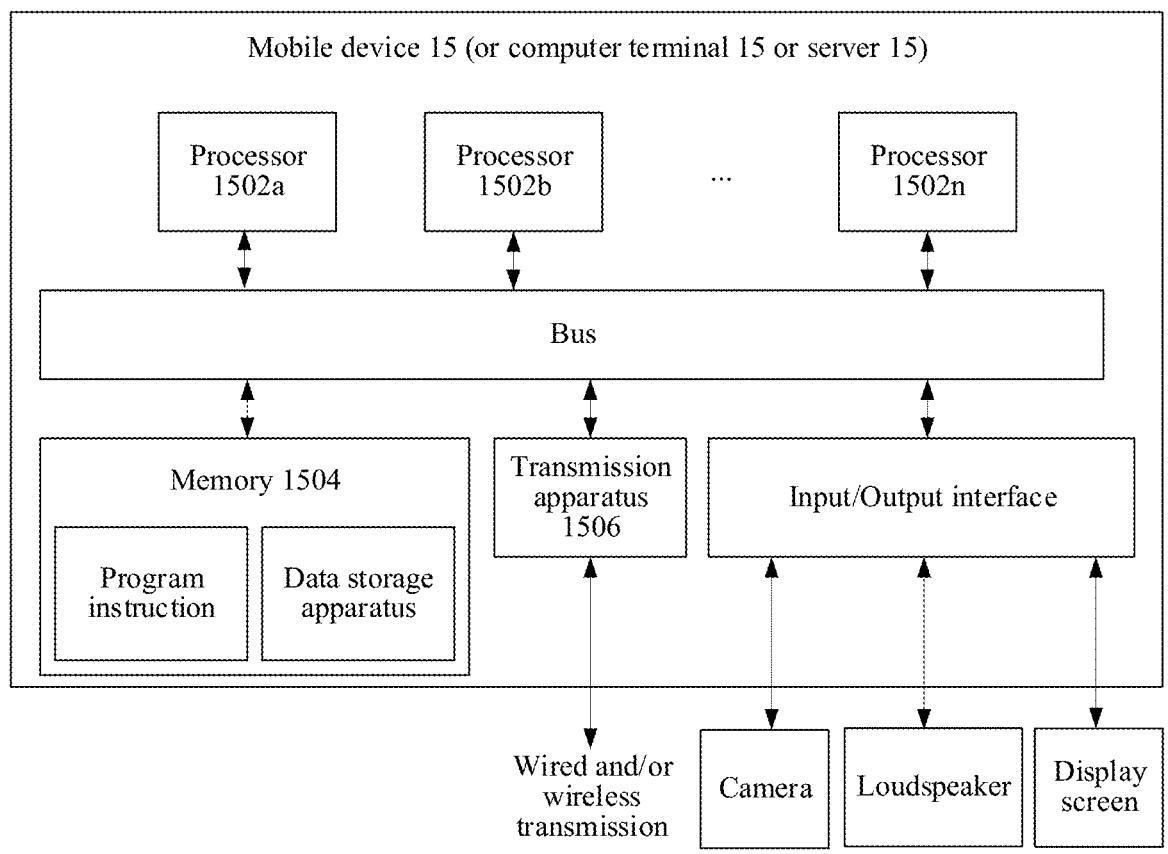
FIG. 15 is a schematic structural diagram of hardware of a computing device configured to implement the method provided in the embodiments of this application according to an embodiment of this application.

The computing device may be a computer terminal, a mobile terminal, or a server. The computing device may alternatively constitute an apparatus or a system provided in the embodiments of this application. For example, as shown in FIG. 15, the computing device may be a mobile terminal 15 (or a mobile device 15 or a computer terminal 15 or a server 15), and may include one or more processors 1502 (shown as 1502a, 1502b, . . . , 1502n in FIG. 15), (the processor 1502 may include, but is not limited to, a processing apparatus such as a microprocessor (MCU) or a programmable logic device (FPGA)), a memory 1504 configured to store data, and a transmission apparatus 1506 configured for communication. The mobile terminal may further include a display, an input/output (I/O) interface, a network interface, a power supply, and/or a camera. A person of ordinary skill in the art may understand that the structure shown in FIG. 15 is merely exemplary, and does not cause a limitation to the structure of the foregoing electronic apparatus. For example, the mobile device 15 may include more or fewer components than those shown in FIG. 15, or have a configuration different from that shown in FIG. 15.

It is to be noted that the foregoing one or more processors 1502 and/or other data processing circuits in the context may be generally referred to as a "data processing circuit." A part or all of the data processing circuit may be embodied as software, hardware, firmware, or any combination thereof. In addition, the data processing circuit may be an independent processing module, or a part or all of the data processing circuit may be combined into any of other elements in the mobile device 15 (or the computer terminal). As mentioned in the embodiments of this application, the data processing circuit is used as a processor to control (for example, selection of a variable resistance terminal path connected to an interface).

The memory 1504 may be configured to store a software program and a module of application software, for example, a program instruction or data storage apparatus corresponding to the method provided in the embodiments of this application. The processor 1502 runs the software program and the module stored in the memory 1504, to implement various functional applications and data processing, that is, to implement the method for making recommendations to a user provided in the embodiments of this application. The memory 1504 may include a high-speed random memory, and a non-volatile memory such as one or more magnetic storage apparatuses, a flash memory, or another non-volatile solid-state memory. In some embodiments, the memory 1504 may further include memories remotely disposed relative to the processor 1502, and these remote memories may be connected to the mobile device 15 through a network. Examples of the network include, but are not limited to, the Internet, an intranet, a local area network, a mobile communication network, and a combination thereof.

The transmission apparatus 1506 is configured to receive or send data through a network. One example of the network may include a wireless network provided by a communication provider of the mobile terminal 15. In one embodiment, the transmission apparatus 1506 includes a network interface controller (NIC), which may be connected to another network device through a base station so as to communicate with the Internet. In one embodiment, the transmission apparatus 1506 may be a radio frequency (RF) module, which is configured to communicate with the Internet wirelessly.

The display may be a touchscreen liquid crystal display (LCD), and the LCD enables the user to interact with a user interface of the mobile device 15 (or the computer terminal).

Although this specification provides methods, operations, and steps described in the embodiments or flowcharts, more or fewer operations and steps may be included based on conventional or non-creative efforts. The order of the steps listed in the embodiments is merely one of a plurality of step execution orders, and does not indicate the only execution order. In a system or terminal product, the steps may be performed in sequence or concurrently according to the method shown in the embodiments or the accompanying drawings (for example, in a parallel processor or a multi-thread processing environment).

The system shown in this embodiment is only a part of the system related to the solution of this application, and does not constitute a limitation to the device to which the solution of this application is applied. Specifically, the device may include more or fewer components than those shown in the figure, or some components may be combined, or the components may be deployed differently. It is to be understood that, the method, apparatus, and the like disclosed in the embodiments may be implemented in other manners. For example, the described apparatus embodiment is merely exemplary. For example, the module division is merely logical function division and may be other division during specific implementations. For example, a plurality of units or components may be combined or integrated into another system, or some features may be ignored or not performed. In addition, the displayed or discussed mutual couplings or direct couplings or communication connections may be indirect couplings or communication connections implemented by using some interfaces, apparatuses, or unit modules.

The term module, and other similar terms such as unit, subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Based on such an understanding, the technical solutions of this application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

A person skill in the art may be further aware that, in combination with examples of units and algorithm steps described in the embodiments disclosed in this specification, this application may be implemented by using electronic hardware, computer software, or a combination thereof. To clearly describe interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

The foregoing embodiments are merely intended for describing the technical solutions of this application, but not for limiting this application. Although this application is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of this application.

What is claimed is:

1. A method for making recommendations to a user, performed by a computing device, the method comprising:
    obtaining user attribute information, reading attribute information, reading history information, and candidate items;
    performing intra-group information fusion on the reading attribute information according to preset groupings to obtain reading feature information;
    obtaining a reading history weight according to the reading history information;
    obtaining history feature information according to the reading history weight and the reading history information;
    obtaining user feature information according to the user attribute information, the reading feature information, and the history feature information;
    inputting the user feature information and the candidate items into a neural network, to determine similarity scores that describe degree of similarity between the user feature information and the candidate items by using an inner product algorithm or a cosine similarity; and
    selecting a recommendation item from the candidate items according to the similarity scores, wherein a quantity of the candidate items exceeds 10 million, and distributed k-nearest neighbor (k-NN) servers are provided to complete on-line real-time recall for selecting the recommendation item.

2. The method according to claim 1, wherein the performing intra-group information fusion on the reading attribute information according to preset groupings to obtain reading feature information comprises:
    performing average pooling on the reading attribute information in a same group to obtain the reading feature information.

3. The method according to claim 1, wherein the obtaining a reading history weight according to the reading history information comprises:
    inputting the reading history information to a self-attention layer model to calculate a self-attention layer output vector of the reading history information; and
    calculating the reading history weight according to the self-attention layer output vector and a preset parameter.

4. The method according to claim 3, wherein the obtaining history feature information according to the reading history weight and the reading history information comprises:
    inputting the self-attention layer output vector to an attention pooling layer model, and performing weighted averaging on the self-attention layer output vector according to the reading history weight to obtain the history feature information.

5. The method according to claim 3, wherein the self-attention layer model performs the following method:
    re-encoding the reading history information to obtain a first feature matrix, a second feature matrix, and a third feature matrix;
    performing linear transformation on the first feature matrix, the second feature matrix, and the third feature matrix, and inputting the first feature matrix, the second feature matrix, and the third feature matrix on which the linear transformation has been performed into a first self-attention model in parallel for a plurality of times, to obtain output results of the first self-attention model;
    concatenating the output results of the first self-attention model and performing linear transformation to obtain a self-attention layer output vector.

6. The method according to claim 1, wherein the obtaining user feature information according to the user attribute information, the reading feature information, and the history feature information comprises:
    combining the user attribute information, the reading feature information, and the history feature information into combined feature information; and
    inputting the combined feature information into a multi-layer neural network to obtain the user feature information that matches dimensions of the candidate items.

7. A user recommendation apparatus, comprising a processor and a memory, the memory storing computer-executable instructions, the computer-executable instructions, when executed by the processor, causing the processor to:
    obtain corresponding reading feature information according to different reading attribute information;
    obtain history feature information according to reading history information;
    obtain user feature information according to user attribute information, the reading feature information, and the history feature information;
    input the user feature information and the candidate items into a neural network, to determine similarity scores that describe degree of similarity between the user feature information and the candidate items by using an inner product algorithm or a cosine similarity; and
    select a recommendation item from candidate items according to the similarity scores, wherein a quantity of the candidate items exceeds 10 million, and distributed k-nearest neighbor (k-NN) servers are provided to complete on-line real-time recall for selecting the recommendation item.

8. The apparatus according to claim 7, wherein the computer-executable instructions further cause the processor to:

input the reading history information into a self-attention layer model to obtain a self-attention layer output vector;

calculate a reading history weight according to the self-attention layer output vector and a preset parameter; and input the self-attention layer output vector to an attention pooling layer model, and perform weighted averaging on the self-attention layer output vector according to the reading history weight to obtain the history feature information.

9. The apparatus according to claim 8, wherein obtaining the history feature information according to the reading history weight and the reading history information comprises:

inputting the self-attention layer output vector to an attention pooling layer model, and performing weighted averaging on the self-attention layer output vector according to the reading history weight to obtain the history feature information.

10. The apparatus according to claim 8, wherein the self-attention layer model performs:

re-encoding the reading history information to obtain a first feature matrix, a second feature matrix, and a third feature matrix;

performing linear transformation on the first feature matrix, the second feature matrix, and the third feature matrix, and inputting the first feature matrix, the second feature matrix, and the third feature matrix on which the linear transformation has been performed into a first self-attention model in parallel for a plurality of times, to obtain output results of the first self-attention model;

concatenating the output results of the first self-attention model and performing linear transformation to obtain a self-attention layer output vector.

11. A non-transitory computer-readable storage medium, storing computer-executable instructions, the computer-executable instructions, when executed by a processor, causing the processor to perform the method for making recommendations to a user, comprising:

obtaining user attribute information, reading attribute information, reading history information, and candidate items;

performing intra-group information fusion on the reading attribute information according to preset groupings to obtain reading feature information;

obtaining a reading history weight according to the reading history information;

obtaining history feature information according to the reading history weight and the reading history information;

obtaining user feature information according to the user attribute information, the reading feature information, and the history feature information;

inputting the user feature information and the candidate items into a neural network, to determine similarity scores that describe degree of similarity between the user feature information and the candidate items by using an inner product algorithm or a cosine similarity; and selecting a recommendation item from the candidate items according to the similarity scores, wherein a quantity of the candidate items exceeds 10 million, and distributed k-nearest neighbor (k-NN) servers are provided to complete on-line real-time recall for selecting the recommendation item.

12. The computer-readable storage medium according to claim 11, wherein the performing intra-group information fusion on the reading attribute information according to preset groupings to obtain reading feature information comprises:

performing average pooling on the reading attribute information in a same group to obtain the reading feature information.

13. The computer-readable storage medium according to claim 11, wherein the obtaining a reading history weight according to the reading history information comprises:

inputting the reading history information to a self-attention layer model to calculate a self-attention layer output vector of the reading history information; and calculating the reading history weight according to the self-attention layer output vector and a preset parameter.

14. The computer-readable storage medium according to claim 13, wherein the obtaining history feature information according to the reading history weight and the reading history information comprises:

inputting the self-attention layer output vector to an attention pooling layer model, and performing weighted averaging on the self-attention layer output vector according to the reading history weight to obtain the history feature information.

15. The computer-readable storage medium according to claim 13, wherein the self-attention layer model performs the following method:

re-encoding the reading history information to obtain a first feature matrix, a second feature matrix, and a third feature matrix;

performing linear transformation on the first feature matrix, the second feature matrix, and the third feature matrix, and inputting the first feature matrix, the second feature matrix, and the third feature matrix on which the linear transformation has been performed into a first self-attention model in parallel for a plurality of times, to obtain output results of the first self-attention model;

concatenating the output results of the first self-attention model and performing linear transformation to obtain a self-attention layer output vector.

16. The computer-readable storage medium according to claim 11, wherein the obtaining user feature information according to the user attribute information, the reading feature information, and the history feature information comprises:

combining the user attribute information, the reading feature information, and the history feature information into combined feature information; and inputting the combined feature information into a multi-layer neural network to obtain the user feature information that matches dimensions of the candidate items.

* * * * *